United States Patent [19]
Paplinski

[11] Patent Number: 5,183,284
[45] Date of Patent: Feb. 2, 1993

[54] COUPLING MECHANISM

[75] Inventor: Walter Paplinski, Edmonton, Canada

[73] Assignee: George Glenn Neis, Red Deer, Canada; a part interest

[21] Appl. No.: 729,835

[22] Filed: Jul. 12, 1991

Related U.S. Application Data

[63] Continuation-in-part of Ser. No. 585,647, Sep. 20, 1990, abandoned.

[51] Int. Cl.$^5$ .............................................. B60D 1/01
[52] U.S. Cl. ..................................... 280/508; 280/435
[58] Field of Search ............... 280/436, 437, 509, 510, 280/508, 515, 435, 504

[56]          References Cited
         U.S. PATENT DOCUMENTS

| | | | |
|---|---|---|---|
| 788,692 | 5/1905 | Ammann | 280/509 |
| 1,233,849 | 7/1917 | Culhane | 280/509 |
| 1,565,112 | 12/1925 | Sommer | 280/509 |
| 2,491,373 | 12/1949 | Goff | 280/508 |
| 2,812,195 | 11/1957 | Kelley | 280/510 |
| 3,013,815 | 12/1961 | Geerds | 280/435 |
| 3,171,672 | 3/1965 | Dalton | 280/437 |
| 3,420,551 | 1/1969 | McMillan, II | 280/509 |
| 4,408,778 | 10/1983 | Steuben | 280/509 |
| 4,962,945 | 10/1990 | Vannoy et al. | 280/509 |

Primary Examiner—Margaret A. Focarino
Assistant Examiner—Kevin Hurley

[57]              ABSTRACT

A coupling mechanism for mounting on a towing vehicle comprises a pair of parallel, horizontal plates that define an opening for receiving a pin oriented perpendicular to the plates, the pin being part of an assembly adapted to be mounted on a vehicle to be towed. A pair of jaws is pivotally mounted between the plates to be movable between a closed position coupling with the pin and an open position releasing the pin. These jaws have rear faces that in the closed position define a space. A downwardly spring-urged locking member is slidably mounted for vertical movement through the upper plate between a downward, locking position in which it extends through the space between the jaw faces and into engagement with the lower plate to retain the jaws in their closed position by engagement with the jaw faces, and an upward, withdrawn position in which the jaws are permitted to move to their open position under the action of a spring to release the pin.

11 Claims, 3 Drawing Sheets

COUPLING MECHANISM

RELATED APPLICATION

This application is a continuation-in-part of application Ser. No 07/585,647 filed Sep. 20, 1990, now abandoned.

FIELD OF THE INVENTION

This invention relates to a coupling mechanism.

The principal use for the invention is as a hitching device for interconnecting a towing and a towed vehicle, and the example of the invention illustrated and described in detail below is such a hitching device. Nevertheless, the invention in its broad aspect can be employed as a general coupling mechanism for other purposes.

PRIOR ART

Coupling mechanisms are known, both for conventional towing and as fifth wheel devices, in which a pair of jaws are movable to a closed position in which they close around a pin, the jaws being locked in this closed position to maintain a connected coupling until they are released in some suitable manner, usually manually.

Such hitching couplers are disclosed, for example, in P. J Culhane U.S. Pat. No. 1,233,849 issued Jul. 17, 1917; R. D. Tracey U.S. Pat. No. 2,676,034 issued Apr. 20, 1954; and G. C. Monckmeier U.S. Pat. No. 2,798,741 issued Jul. 9, 1957; and as fifth wheel couplers in W. D. Walther et al U.S. Pat. No. 3,787,076 issued Jan. 22, 1974 (corresponding Canadian Pat. 956,339 issued Oct. 15, 1974); T. B. Dalton Canadian Pat. 650,880 issued Oct. 23, 1962; and P. M. Davies Canadian patent 1,042,475 issued Nov. 14, 1978.

SUMMARY OF THE INVENTION

The object of the invention is to provide improvements in such a mechanism, and in particular to provide a coupling mechanism that is more convenient to use.

In particular, it is an object of the invention to provide a coupling mechanism that will be both more reliable in use and more compact in the front-to-rear direction than former constructions, and that will be capable of being readily mounted in the limited space typically available at the rear of a towing vehicle.

To this end, the invention consist of a coupling mechanism comprising a pair of parallel plates interconnected in a spaced relationship and together defining an opening for receiving a pin oriented perpendicular to the plates. A pair of jaws is pivotally mounted between the plates to be movable between a closed position coupling with the pin and an open position releasing the pin. The jaws have respective faces that in the closed position define a space. A locking member is slidably mounted for movement through one of the plates between a locking position extending through the space between the jaw faces and into engagement with the other plate to retain the jaws in the closed position, and a withdrawn position permitting movement of the jaws to the open position to allow withdrawal movement of the pin from the mechanism. When in this closed position, the jaw faces engage surfaces on opposite sides of the locking member so that a force urging the jaws to their open position, i.e. urging the jaw faces together, is resisted by compression of the locking member.

Preferably, the locking member will be spring urged towards its locking position, and the jaws will be spring urged towards their open position, with the jaw faces that define the space in the closed position limiting the opening movement of the jaws.

As an additional safety consideration, the coupling will also preferably include a pair of additional locking members, each for extending through both of the plates and a respective jaw, for retaining the jaws in the closed position.

The invention is also directed to a combination of the coupling device defined above and a pin assembly to be mounted on apparatus to be coupled to the coupling device, e.g. a conveyance to be towed, such pin assembly preferably taking the form of a pair of spaced plates between which the pin that is engaged by the jaws extends.

In the preferred embodiment of the invention, the lower plate of the pin assembly is a load bearing plate that enters a space between the lower one of the jaw-supporting plates of the coupling mechanism and a third plate of the coupling mechanism for the purpose of transferring a vertical load to such third plate.

Also in the preferred embodiment, the plate assembly is pivotally mounted on a base that is adapted for securing to a towing vehicle, such pivotal movement taking place about a horizontal, transverse axis that extends through the centers of cut-out portions of the jaws that engage the pin when the jaws are in the closed position.

DETAILED DESCRIPTION OF THE EMBODIMENTS

Figure 1:
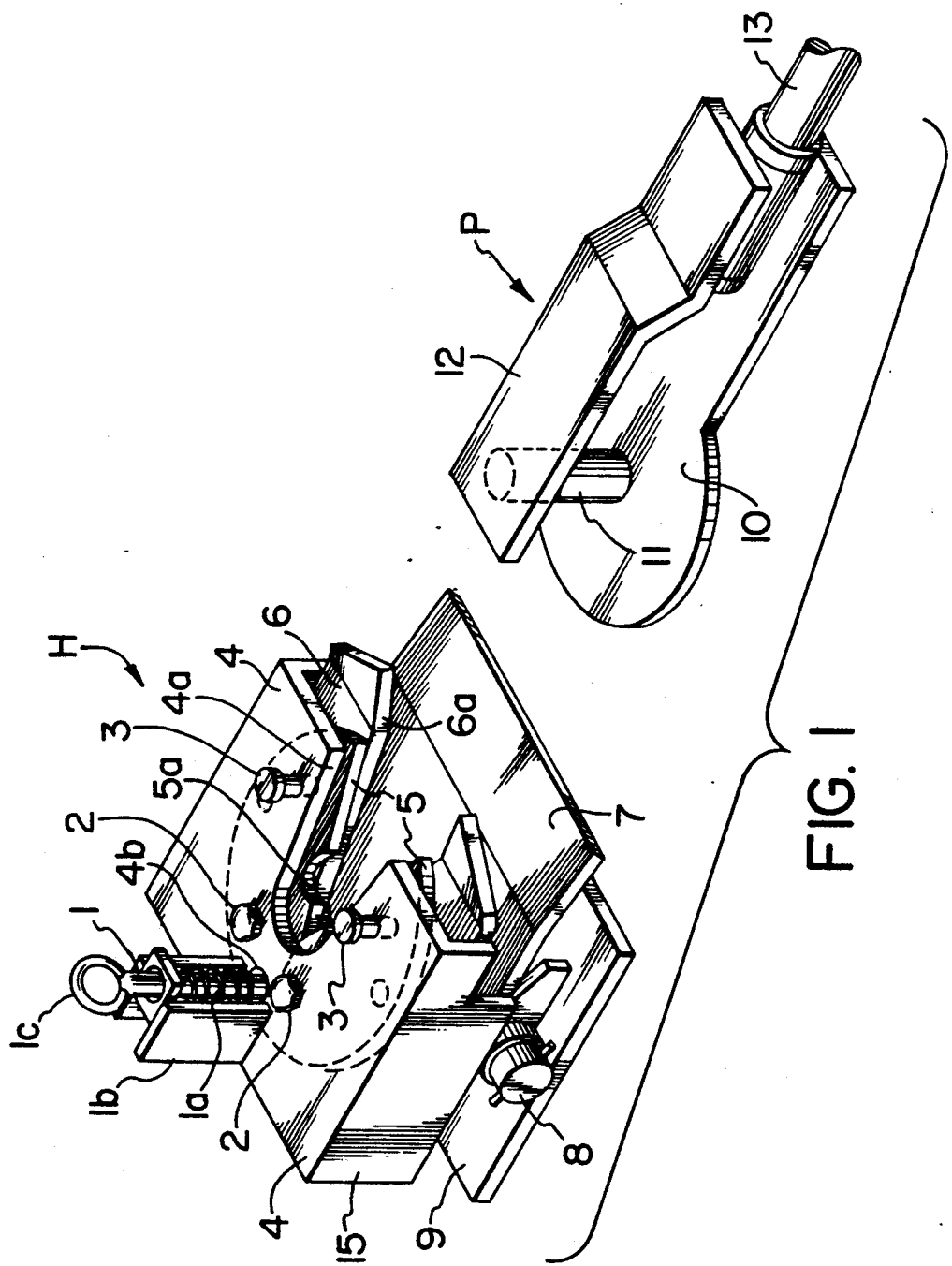
FIG. 1 is an exploded perspective view of two parts of a hitching device according to one embodiment of the invention, shown in its uncoupled condition.
Figure 2:
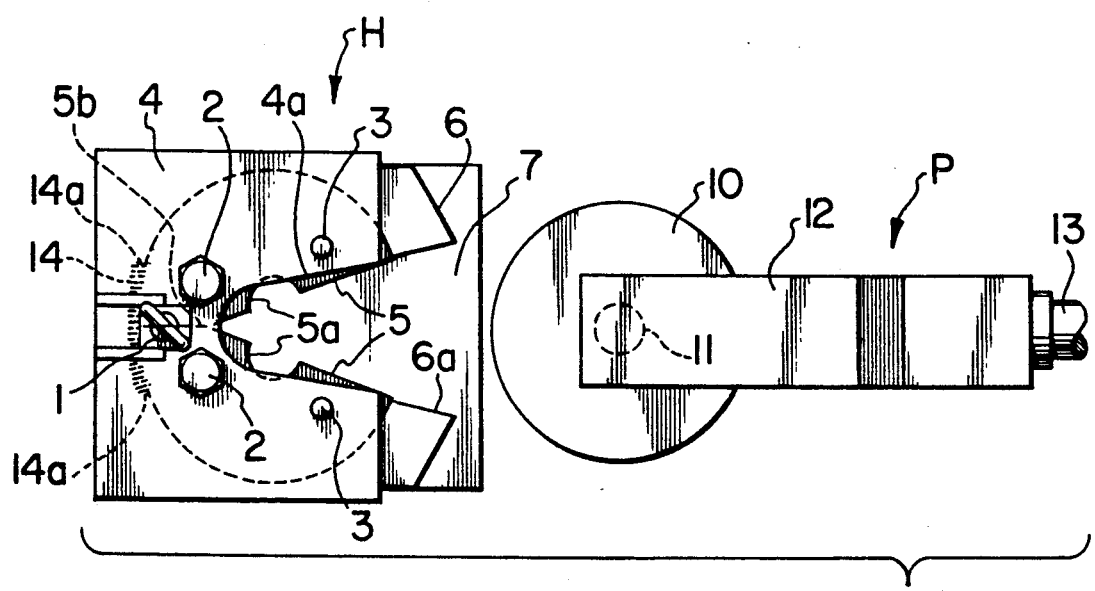
FIG. 2 is a plan view of FIG. 1.

The embodiment of the invention illustrated in FIGS. 1-4 is a coupling device consisting of a hitch mechanism H adapted to be secured to a towing vehicle and to receive and become coupled to a pin assembly P that will be attached to a conveyance to be towed.

The hitch mechanism H includes a plate assembly consisting primarily of a parallel, spaced-apart pair of horizontal plates 4 and 6, having frontal, divergent openings 4a, 6a, respectively, and between which a pair of movable jaws 5 is located. Each jaw 5 is pivotable about a vertical pin 2 extending between the plates 4 and 6, and the jaws are movable between an open position shown in FIGS. 1 and 2 and a closed position seen in FIGS. 3 and 4. Each jaw 5 has a semi-circular cut-out portion 5a that, in the closed position, embraces a pin 11 of the pin assembly P to couple the two assemblies together, the pin 11 having been guided into the hitch mechanism H by the openings 4a, 6a of the plates 4, 6. Each jaw 5 has an inclined face 5b at its rear. For convenience, the left hand end of the hitch mechanism H as seen in the drawings will be considered as its rear, although, when mounted on a towing vehicle, this end will be nearer the front of the vehicle. When the jaws 5 are open these two faces 5b abut each other to limit the open position (FIG. 2), the jaws being urged towards this position by a coiled tension spring 14, each end of which is connected to a respective jaw at 14a.

Figure 3:
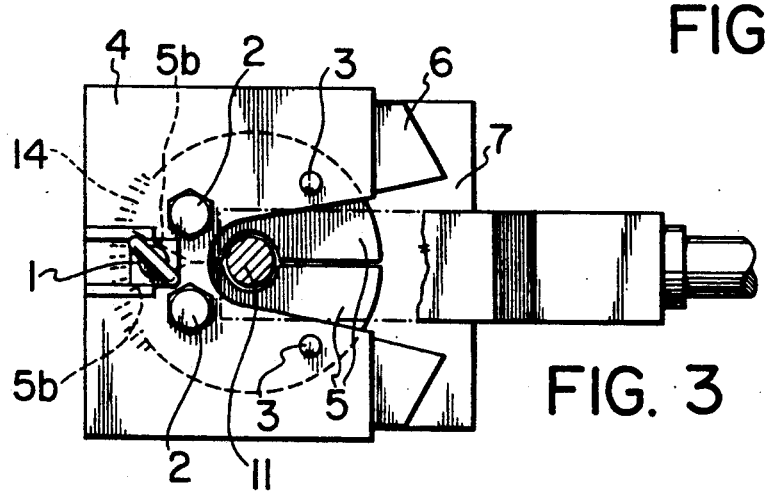
FIG. 3 is a similar plan view with the parts in the coupled condition.

However, when the pin 11 is pushed to the left into the jaws 5, as seen in FIG. 3, it exerts a force on each jaw to turn it about its pivot pin 2 against the tension of the spring 14. This movement separates the jaw faces 5b, providing a space between these faces, into which a vertical locking member 1 can slide downwardly under the action of a spring 1a. The locking member 1 is mounted in a framework 1b secured to the upper plate 4, so as to be vertically slidable a hole 4b in the upper plate 4 and the space between the rear jaw faces 5b, into a corresponding hole 6b in the lower plate 6 (see FIG. 4). The spring 1a retains the locking member 1 in this downward (locking) position until it is pulled upwards manually to its withdrawn position using a finger ring 1c, whereupon the spring 14 will act to open the jaws 5 and release the pin 11, assuming that the pin is no longer exerting an inward force on the jaws.

Further safety for retaining the jaws in their closed position and hence the device in its coupled condition can be provided in the form of safety locking pins 3 that are inserted manually through aligned vertical holes in the upper plate 4, jaws 5 and lower plate 6.

In the pin assembly P the pin 11 extends vertically between a lower plate 10 and an upper member 12, these parts being pivotally secured to a shaft member 13 so as to be freely rotatable about a horizontal, front-to-rear axis. The member 13 serves for securing the assembly P to a conveyance to be towed (not shown).

Figure 4:
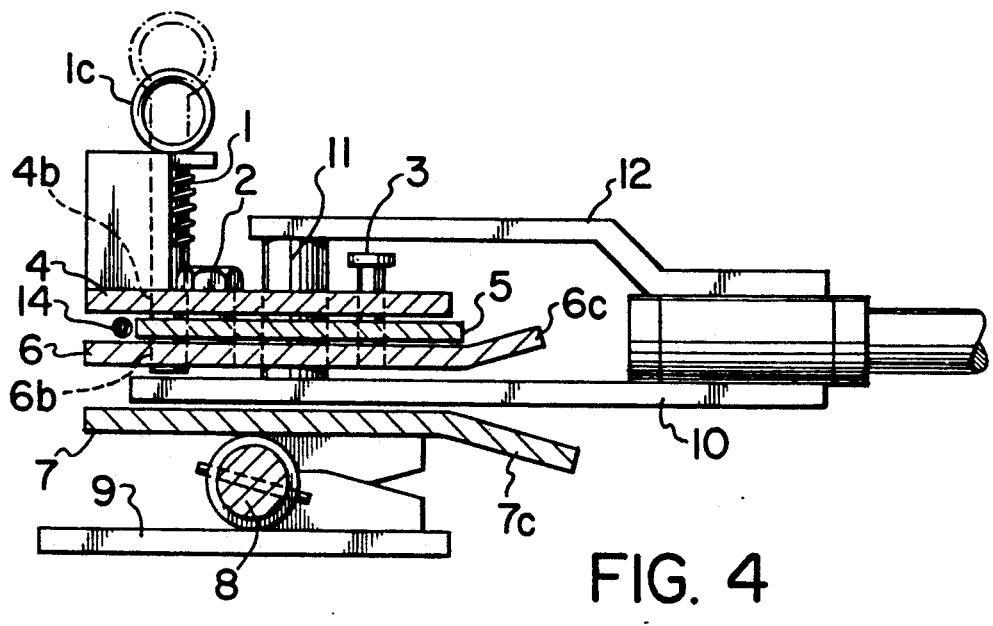
FIG. 4 is a partially sectioned, side view, as seen from below FIG. 3.

The upper plate 4 extends into vertical side plates 15 (FIG. 1) that serve to secure the two plates 4 and 6 together and also to secure beneath them and spaced from the lower plate 6 a further horizontal plate 7. The space between the plates 6 and 7 serves to receive the plate 10 of the assembly P, the front edges 6c and 7c of these plates being inclined to the horizontal to help guide the plate 10 into such space, as best seen in FIG. 4.

The mechanism H is mounted on a base 9 by means of a horizontal, laterally extending, swivel mechanism in the form of a pin 8. The base 9 will be secured to a towing vehicle (not shown).

It is an important feature of the present invention that the primary locking member 1 slides vertically when entering the space between the jaw faces. This arrangement, in contrast to the use of a horizontally sliding member, as employed in many prior devices, has the advantage that the mechanism is more compact in the front-to-rear direction. In practice there is often very limited space between the rear of the hitch mechanism H and the framework of the towing vehicle, e.g. when mounted on the drawbar of a farm tractor or on the back framework of a tandem axle truck. To accommodate a horizontal, rear entry pin, as proposed for example in the patents to Tracey, Walther et al, Dalton and Davies mentioned above would in many cases require a physical alteration to the back portion of the towing vehicle on which the hitch mechanism is to be mounted. Apart from being expensive, such alterations often cannot be made without adversely affecting the performance of the towing vehicle. In the Monckmeier patent, although the latch member 52 enters the space between the jaws by means of a vertical movement, such movement is a pivotal one that takes place about a shaft 54 located to the rear of the latch member 52. Hence again the locking mechanism extends significantly to the rear beyond the rear edges of the jaws, a space requirement that the present invention avoids by employing a vertically slidable locking member to enter the space between the jaws.

As a result, a very practical advantage of the vertical entry, sliding member 1 of the present invention is that the back edge of the hitch mechanism H can be mounted flush to any mounting framework, while still enabling the movable locking jaw concept to be used.

In addition, the present invention provides a construction in which the locking member 1 not only enters the space between the jaws 5, but in doing so passes through a hole in both the plate 4 above the jaws and the plate 6 below the jaws. This support of the member 1 both above and below its central portion that is engaged by the jaw faces 5b avoids any risk of the free end of the pin 1 being pushed aside or bent by the jaws.

It is also significant that when the jaws are in the closed position their rear surfaces 5b engage surfaces on opposite sides of the locking member 1. As a result, a force urging the jaws to their open position is resisted by compression of the locking member 1. This is an important distinction over the mechanism disclosed in the Culhane patent referred to above where rear faces of a pair of jaws are engaged by a member 4 the releasing movement of which can be restrained by a pin 20. It is this pin 20 that resists opening of the jaws, and this pin is stressed in shear across its cross-sections located in the planes between the member 4 and the fixed plates 13 and 14. As is well known, in contrast to a member that is subjected to shear forces across its width, a similar member that is subjected to a transverse compression force is much less likely to fail and can withstand much large forces before yielding. Alternatively it can be made with a smaller transverse dimension (diameter, when the locking member is a cylindrical pin) than would be required to resist its shearing.

A further advantage of the present invention over the Culhane mechanism resides in its simplicity, and, in particular, the avoidance of any front-to-rear sliding action such as is represented by Culhane's member 4. The member 4 is fixed, being a drawbar that is connected to a towing vehicle, while the remainder of his coupling mechanism slides over the member 4. This arrangement means that the Culhane mechanism cannot be mounted flush against a plate such as a bumper of a pickup truck, the back of a gravel truck to pull a trailer unit, on a modern agricultural drawbar, or on a modern highway transport unit. In many cases, a flush mounting is mandatory and a mechanism like Culhane's requiring room to slide would be unusable. Keeping the overall length to a minimum is an important consideration in hitch devices and a major advantage of the present construction.

A still further advantage of the construction illustrated in the drawings resides in the provision of the secondary safety pins 3 which also pass through the plate 4 above the jaws 5 and into the plate 6 beneath them.

Another significant feature of the device described herein is the provision of the third and lowermost plate 7 as a vertical load bearing part of the hitch mechanism H, since the plate 7 receives a downward vertical force from the plate 10 of the pin assembly P. In prior proposals the vertical load bearing capacity of the hitch mechanism has been provided above the locking jaws, which is a reason why the locking pins have usually been arranged to enter the jaws horizontally. In the present arrangement, on the other hand, since the load bearing capacity of the plate assembly (plate 7) is below the jaws 5, the primary locking member 1 (and indeed also the secondary locking pins 3) can enter from above and hence be readily accessible, at the same time achieving the horizontal space saving advantages already explained. The load bearing plate 7 of the hitch mechanism H thus cooperates with the load transmitting plate 10 of the pin assembly P in a novel manner.

Figure 5:
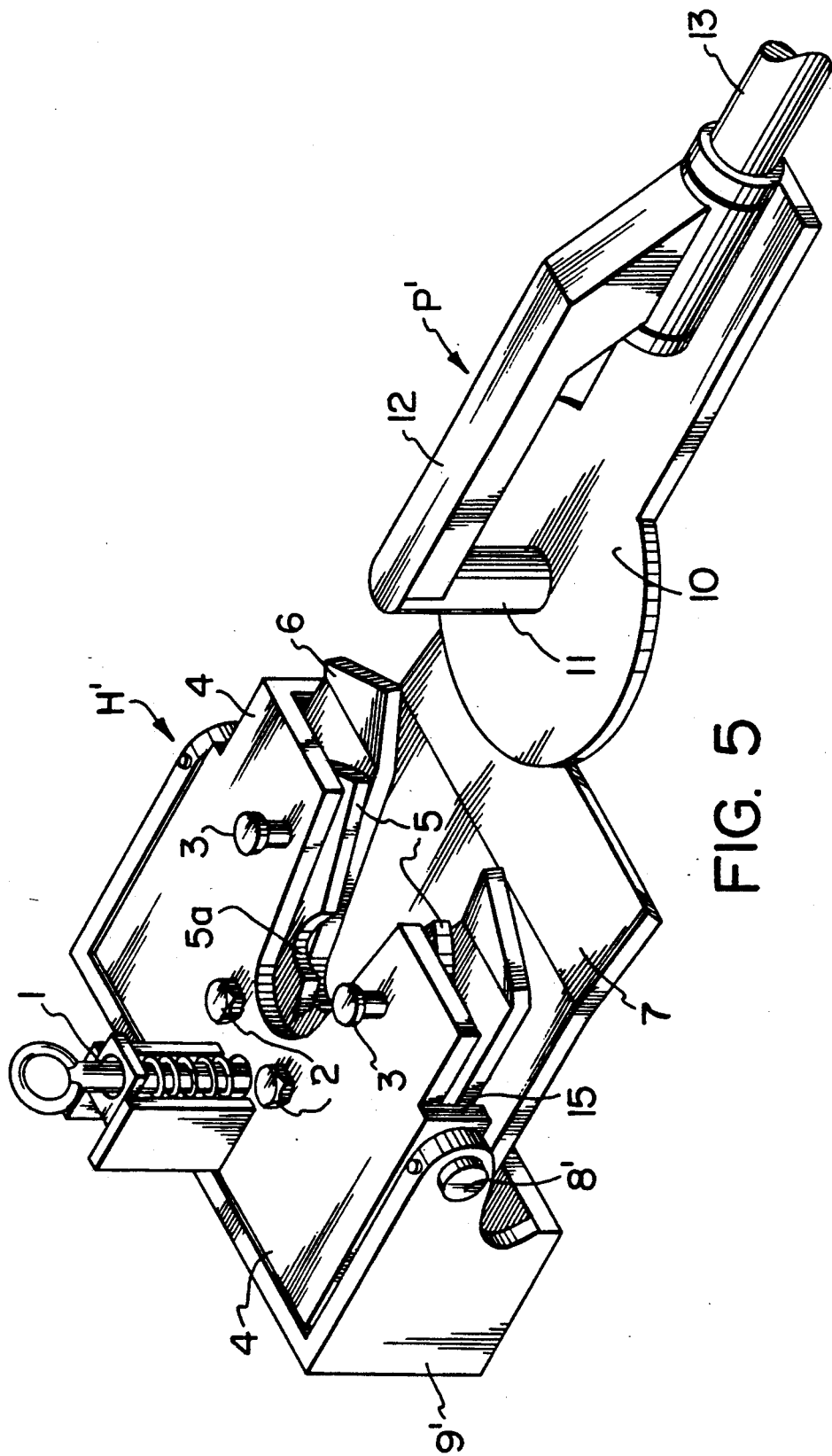
FIG. 5 is a view similar to FIG. 1 of a further and preferred embodiment.

FIG. 5 shows an alternative and preferred embodiment of the invention wherein the base 9 is replaced by a base 9' in a modified hitch mechanism H'. The base 9' extends around the rear of the plates 4, 6 and the jaws 5 to support a swivel mechanism in the form of pins 8' that project laterally inwardly to each side plate 15. The horizontal transverse axis defined by the swivel pins 8' is aligned with the centers of the cut-out portions 5a of the jaws 5 in both the horizontal front-to-rear direction and the vertical direction, so as to be aligned with the vertical axis of the pin 11 approximately midway of its height when the jaws are closed and the pin 11 is locked in the towing position illustrated for the first embodiment in FIG. 3 and which will be essentially the same for the second embodiment of FIG. 5. This alignment of the swivel axis with the pin 11 minimizes wear in use. The other parts of the hitch mechanism H' are basically the same as the mechanism H, and the mechanism P' is also basically the same as the mechanism P. Each side plate 15 is attached to the lowermost plate 7, as in FIG. 1, except that the attachment is further to the rear and hence not visible in FIG. 5, in order to permit a large arc of movement of the plates 4, 6 about the pin 8'.

I claim:

1. A coupling mechanism comprising
   (a) first and second parallel plates interconnected in a spaced relationship and together defining an opening for receiving a pin oriented perpendicular to said plates, said mechanism being adapted for mounting with said plates lying in substantially horizontal parallel planes;
   (b) a pair of jaws pivotally mounted between said plates to be movable between a closed position coupling with said pin and an open position releasing said pin;
   (c) said jaws having respective faces that in the closed position define a space;
   (d) a locking member slidably mounted for movement through one of said plates between a locking position extending through said space between the jaw faces and into engagement with the other plate to retain the jaws in the closed position, and a withdrawn position permitting movement of the jaws to the open position to allow withdrawal movement of the pin from the mechanism; and
   (e) a third plate secured parallel to and spaced below the lower one of said first and second plates, said lower and third plates defining a space for receiving a horizontally oriented load transmitting plate attached to the pin for transferring a vertical force to the coupling mechanism.

2. A mechanism according to claim 1, including a spring urging the locking member towards its locking position.

3. A mechanism according to claim 1, including a spring urging the jaws towards the open position, said jaw faces limiting opening movement of the jaws.

4. A mechanism according to claim 1, including a pair of additional locking members each for extending through both of said plates and a respective jaw for retaining the jaws in the closed position.

5. A mechanism according to claim 1, including a base for securing to a towing vehicle, and a swivel mechanism mounting said plates on the base for pivotal movement about an axis that extends parallel to the planes of said plates and transverse to the direction of said withdrawal movement of the pin from the jaws.

6. A mechanism according to claim 5, wherein said axis of the swivel mechanism extends through portions of the jaws that engage the pin.

7. The combination of a mechanism according to claim 1, and a pin assembly including the pin, the load transmitting plate, and a further horizontal member connected to the load transmitting plate in a vertically spaced relationship therewith, the pin extending vertically between said further member and the load transmitting plate.

8. The combination of claim 7, wherein the pin assembly includes means for mounting such assembly on a towed vehicle in such a manner as to be pivotable about a horizontal axis extending through the pin.

9. A mechanism according to claim 1, wherein the locking member projects upwardly from the upper one of said first and second plates to be slidable vertically through said upper plate into engagement with the lower one of said first and second plates in the locking position.

10. A coupling mechanism according to claim 1, wherein said jaw faces engaging the surfaces on opposite sides of the locking member in said closed position whereby a force urging the jaws to their open position is resisted by compression of the locking member.

11. A hitching device comprising the combination of a coupling mechanism for mounting on a towing vehicle and a pin assembly for mounting on a towed vehicle, said pin assembly comprising a horizontally oriented load transmitting plate, a pin projecting vertically upwardly from said plate, a further horizontal member interconnected with and vertically spaced from the plate to support the upper end of the pin, and means for mounting the assembly on the towed vehicle so as to be pivotable about a horizontal axis extending through the pin; and said coupling mechanism comprising
   (a) a base for connection to the towing vehicle,
   (b) a plate assembly,
   (c) said plate assembly comprising three interconnected, horizontally oriented, spaced apart, parallel plates together defining an opening for receiving the pin of the pin assembly,
   (d) a pair of jaws pivotally mounted between the upper pair of said three plates to be movable between a closed position in which cut-out portions of said jaws couple with said pin and an open position releasing said pin,
   (e) said jaws having respective faces that in the closed position define a space,
   (f) first spring urging the jaws towards the open position, said jaws faces limiting opening movement of the jaws,
   (g) a locking member slidably mounted for vertical movement through the upper one of said three plates between a locking position extending through said space between the jaw faces and into engagement with the lower one of said upper pair of plates to provide opposite surfaces directly engaging the jaw faces in said closed position whereby to retain the jaws in the closed position by resisting compression applied by said jaw faces, and a withdrawn position permitting movement of the jaws to the open position to allow withdrawal movement of the pin from the coupling mechanism, (h) a second spring urging the locking member towards its locking position and manually operable means for overcoming said second spring for moving the locking member to its withdrawn position, (i) the lower pair of said three plates defining a space between them for receiving the load transmitting plate of the pin assembly, and (j) a swivel mechanism mounting said plate assembly on the base for pivotal movement about a horizontal axis extending transversely of the plate assembly through said cut-out portions of the jaws when said jaws are in the closed position.

* * * * *